United States Patent
Asai et al.

(10) Patent No.: US 6,723,813 B2
(45) Date of Patent: Apr. 20, 2004

(54) METHOD OF PREPARING AN ACRYLIC COPOLYMER HAVING AN ACID ANHYDRIDE GROUP

(75) Inventors: Tomohito Asai, Suita (JP); Shinya Yamada, Nishinomiya (JP); Yusuke Ninomiya, Yokohama (JP)

(73) Assignee: Nippon Paint Company, Ltd., Osaka (JP)

( * ) Notice: Subject to any disclaimer, the term of this patent is extended or adjusted under 35 U.S.C. 154(b) by 0 days.

(21) Appl. No.: 10/462,636

(22) Filed: Jun. 17, 2003

(65) Prior Publication Data

US 2003/0236372 A1 Dec. 25, 2003

(30) Foreign Application Priority Data

Jun. 20, 2002 (JP) ........................................ 2002-179256

(51) Int. Cl.$^7$ .............................................. C08F 122/04
(52) U.S. Cl. .................... 526/271; 526/272; 526/318.2; 526/318.4; 526/318.44; 526/328.5; 526/329.2; 526/329.6
(58) Field of Search ................................ 526/271, 272, 526/318.2, 318.4, 318.44, 328.5, 329.2, 329.6

(56) References Cited

U.S. PATENT DOCUMENTS

| | | | | |
|---|---|---|---|---|
| 3,840,390 A | * | 10/1974 | Kozu et al. ................. | 427/519 |
| 3,887,642 A | * | 6/1975 | Vandersmissen ............. | 524/512 |
| 4,046,727 A | * | 9/1977 | Itoh et al. .................... | 523/220 |
| 5,270,392 A | * | 12/1993 | Okude et al. ................ | 525/207 |
| 5,977,256 A | * | 11/1999 | Huybrechts et al. ......... | 525/131 |
| 6,472,020 B1 | * | 10/2002 | Yoshioka et al. ......... | 427/407.1 |

* cited by examiner

Primary Examiner—Helen L. Pezzuto
(74) Attorney, Agent, or Firm—Townsend & Banta

(57) ABSTRACT

The present invention is a method of preparing an acrylic copolymer having an acid anhydride group with a number average molecular weight of 1,500–5,000 comprising;

polymerizing a monomer mixture of a radical polymerizable monomer having an acid anhydride group and another radical polymerizable monomer at a temperature of 150° C. or higher by using a radical initiator, wherein the concentration of the monomer mixture is 50–75 wt %.

This method can provide an acrylic copolymer having an acid anhydride group with a relatively low molecular weight that does not cause the problem of yellowing after baking when used in an acid/epoxy curing type clear paint, by means of high temperature polymerization without the use of a large amount of an expensive initiator.

8 Claims, No Drawings

METHOD OF PREPARING AN ACRYLIC COPOLYMER HAVING AN ACID ANHYDRIDE GROUP

RELATED APPLICATION

This application claims the priority of Japanese Patent application No. 2002-179256 filed on Jun. 20, 2002, which is incorporated herein by reference.

BACKGROUND OF THE INVENTION

1. Field of the Invention

The present invention relates to a method of preparing an acrylic copolymer having an acid anhydride group.

2. The Prior Art

Recently, the acid/epoxy curing type is often used for a clear coating for the top coat of automobiles because of its durability under acidic rain. For a polymer having an acid group, a polymer having a so-called half ester unit prepared by using an alcohol for ring opening of a polymer having an acid anhydride group, described in Japanese Patent Laid-Open No. H03-287650, is often chosen for reactivity control reasons.

In order to obtain a good film appearance even with the minimized amount of the organic solvent contained, for the sake of reducing the burden on the environment, the viscosity of the polymer, an ingredient of the aforementioned clear coating, needs to be lowered. For this purpose, the number average molecular weight of the aforementioned polymer having an acid group is designed to be several thousands. A polymer with such a molecular weight can be obtained by using more than the usual amount of the initiator, which is a costly material. However, this is not a cost effective method.

It is known that the molecular weight of the obtained polymer can be lowered without the use of a large quantity of an expensive initiator by conducting polymerization at higher temperatures. However, the acrylic copolymer having an acid anhydride group obtained by simply conducting the polymerization at higher temperatures has a problem in that the obtained coating film occurs yellow discoloration when it is used in the clear coating and baked.

The object of the present invention is to provide a method of preparing, by means of high temperature polymerization without the use of a large amount of an expensive initiator, an acrylic copolymer having an acid anhydride group with a relatively low molecular weight that does not cause the problem of yellowing after baking when used in an acid/epoxy curing type clear paint.

BRIEF SUMMARY OF THE INVENTION

The method of preparing an acrylic copolymer having an acid anhydride group of the present invention is a method of preparing the copolymer with a number average molecular weight of 1,500–5,000 by polymerizing a monomer mixture of a radical polymerizable monomer having an acid anhydride group and another radical polymerizable monomer at a temperature of 150° C. or higher by using a radical initiator wherein the concentration of the monomer mixture is 50–75 wt %. Further, the abovementioned number average molecular weight may be 2,000–3,000, and the aforementioned monomer mixture concentration may be 55–70 wt %. Furthermore, the aforementioned radical initiator may be an active radical species that generates alkyl radicals.

DETAILED DESCRIPTION OF THE INVENTION

The method of preparing an acrylic copolymer having an acid anhydride group of the present invention uses as the raw material a monomer mixture of a radical polymerizable monomer having an acid anhydride group and another radical polymerizable monomer.

Examples of the aforementioned radical polymerizable monomer having an acid anhydride group include itaconic acid, anhydrous itaconic acid, anhydrous maleic acid, and anhydrous citraconic acid. Anhydrous maleic acid is preferable because of its reactivity.

Examples of the other radical polymerizable monomer include styrene, α-methyl styrene, acrylates (such as methyl acrylate, ethyl acrylate, propyl acrylate, n, i, and t-butyl acrylate, 2-ethylhexyl acrylate, and lauryl acrylate), methacrylates (such as methyl methacrylate, ethyl methacrylate, propyl methacrylate, n, i, and t-butyl methacrylate, 2-ethylhexyl methacrylate, and lauryl methacrylate), acrylamide and methacrylamide.

The amount of the radical polymerizable monomer having an acid anhydride group in the aforementioned monomer mixture is preferably 10–40 wt %, more preferably 15–30 wt %, of the total amount of the monomer.

In the method of preparing an acrylic copolymer of the present invention, the aforementioned monomer mixture concentration is characteristically 50–75%. This monomer mixture concentration refers to the ratio of the monomer mixture to the total amount of the solvent used for polymerization plus the monomer mixture. If the monomer mixture concentration is less than 50 wt %, then the problem of yellowing after baking occurs when the obtained acrylic copolymer is used for coating. Also, polymerization becomes difficult if it is more than 75 wt %. The lower limit of the preferable range of the aforementioned monomer mixture concentration is 55 wt %, and the upper limit is 70 wt %.

Selection of the solvent used in the aforementioned polymerization is not limited in particular, as long as it does not react with the acid anhydrate group. It is preferable to consider the polymerization temperature and the fact that the solvent is used for a thermosetting coating. If the radical polymerizable monomer having the acid anhydride group is solid, it is also preferable to choose those that can dissolve it. Specific examples of the aforementioned solvent used for polymerization include ethylene glycol monomethyl ether acetate, ethylene glycol monoethyl ether acetate, propylene glycol monomethyl ether acetate, isoamyl acetate, oxohexyl acetate, methylmethoxybutyl acetate, ethylethoxy propionate, and ethylene glycol monobutyl ether acetate.

The method of preparing an acrylic copolymer of the present invention uses a radical initiator. Selection of the aforementioned radical initiator is not limited in particular, but since the polymerization reaction is carried out at a high temperature as described later, i.e. 150° C. or higher, a radical initiator that is suitable for such a polymerization temperature, such as those with a half-life of 10 seconds to 15 minutes at 170° C., is preferable. The amount of the radical initiator used in the preparation method of the acrylic copolymer of the present invention can be reduced to 0–80% of the amount used for conventional acrylic copolymerization carried out at a temperature lower than 150° C.

Also, for the aforementioned radical initiator, a preferable choice is an active radical species that generates alkyl radicals, which has a weaker hydrogen drawing ability compared with the oxygen radical and phenyl radical. Examples of the preferable radical initiators that generate alkyl radicals include di-t-amyl peroxide and di-t-hexyl peroxide.

The polymerization temperature for the method of preparing an acrylic copolymer of the present invention is 150°

C. or higher, preferably 160° C. or higher. The upper limit is not limited in particular, but 200° C. or lower is preferable when the selection of the solvent used and the design of the polymerization reactor vessel are taken into consideration. In order to carry out the aforementioned polymerization at 150° C. or higher, it is preferable to use a reactor vessel that can keep the reaction system in a sealed condition. When a reactor vessel that can seal the reaction system is used and a solvent having a boiling point lower than the polymerization reaction temperature is chosen, the pressure in the reactor vessel at the time of polymerization inevitably becomes higher than the atmospheric pressure. However, this pressure does not affect the properties of the acrylic polymer thus obtained.

The method of preparing an acrylic copolymer of the present invention can use conventionally well known procedures of acrylic polymerization. For example, a method is used in which the monomer mixture and the radical initiator are dropped into the solvent which has been heated up to the prescribed temperature. As necessary, aging for a prescribed time can be done, and a post-shot to reduce residual monomers can be done as well.

The number average molecular weight of the acrylic copolymer having an acid anhydride obtained by the preparation method of the present invention is 1,500–5,000. If it is lower than 1,500 then the curability when used for coating becomes insufficient. If it is higher than 5,000 then the viscosity of the acrylic copolymer increases, and therefore the amount of the organic solvent used to prepare coating also increases, which is not preferable. For the preferable range of the number average molecular weight, the lower limit is 2,000 and the upper limit is 3,000. The weight average molecular weight is preferably approximately twice the number average molecular weight or less. The aforementioned number average molecular weight can be adjusted by how much the aforementioned radical initiator is used. For example, it can be 1–15 wt % of the amount of the monomer mixture. The number average molecular weight and weight average molecular weight can be determined by means of gel permeation chromatography (GPC) measurements.

The acrylic copolymer having an acid anhydride group obtained by the preparation method of the present invention has at least two, preferably 2–15, acid anhydride groups in one molecule. Less than two would result in a shortcoming of insufficient curability when used for coating. The aforementioned acrylic copolymer having an acid anhydride group is usually used in a half-esterified form by opening the ring of the acid anhydride group by adding an alcohol.

Examples of the alcohol for the aforementioned half-esterification include low molecular weight alcohols such as methanol, ethanol, n-propanol, i-propanol, n-butanol, i-butanol, t-butanol, methyl cellosolve, ethyl cellosolve, dimethylamino ethanol, diethylamino ethanol, acetol, allyl alcohol, and propalgyl alcohol. Of these, particularly preferable are acetol, allyl alcohol, propalgyl alcohol, and methanol. The aforementioned half-esterification follows a conventional method. For example, it can be carried out at room temperature to 120° C., and a catalyst such as tertiary or quaternary ammonium salt can be used.

The aforementioned half-esterified polymer can be combined with an acrylic copolymer having an epoxy group and hydroxyl group to form a thermosetting coating. This thermosetting coating is commonly used as a clear type. But it can also be in a form that contains pigments. In addition to the aforementioned ingredients, the aforementioned thermosetting coating contains a catalyst and various additives. It can further contain chemical compounds and resins having reactive groups.

The acrylic copolymer having an acid anhydride group obtained with the preparation method of the present invention reduces the coloring of the film after baking when it is half-esterified and used as the acid ingredient of an acid/epoxy curing type coating. We think the cause of yellowing at the time of baking is probably due to the fact that hydrogen is drawn out of the solvent used for the polymerization reaction. This problem is believed to have been solved by increasing the monomer mixture concentration. The fact that the use of an initiator which generates alkyl radicals with weaker hydrogen drawing abilities is effective for further preventing coloring supports this cause.

The preparation method of the present invention allows a reduction in the amount of the initiator compared with conventional acrylic polymerization, and therefore a targeted relatively low molecular weight acrylic polymer can be obtained at a lower cost.

Conventionally, acrylic polymerization was carried out at temperatures lower than 150° C. and at low concentrations, which sometimes forces the use of so-called HAPs, which are hazardous air pollutants, as the solvent due to the monomer solubility requirement. In such cases, the low boiling point solvent was removed from the system by means of distillation after obtaining the polymer. The preparation method of the present invention does not require such a procedure and can directly provide a highly concentrated acrylic polymer that does not contain HAPs.

EXAMPLES

Examples 16.2 parts of butyl acetate was loaded into a pressure tight vessel equipped with a stirrer, a thermometer, a reflux condenser, and a dropping pump. In a nitrogen atmosphere the temperature was raised to 100° C. while stirring was maintained. At 100° C., the reactor vessel was sealed and the temperature was raised to 160° C. A mixture of 5 parts of styrene, 15 parts of methyl methacrylate, 12.5 parts of 2-ethylhexyl acrylate, 15 parts of 2-ethylhexyl methacrylate, and 28.5 parts of n-butyl methacrylate as well as 24 parts of maleic acid anhydride dissolved in 24 parts of propylene glycol monomethyl ether acetate along with 10 parts of t-amyl peroxide were each dropped over three hours using a dropping pump. After completion of the dropping, for the purpose of ensuring there would be no residual ingredients in the dropping path, each path, except that for the maleic acid anhydride, was rinsed with 0.5 parts of butyl acetate. Then heating was continued for 30 minutes at 170° C. Furthermore, a mixed solution of 0.5 parts of di-t-amyl peroxide and 1.5 parts of butyl acetate was dropped as a post-shot, followed by an hour of heating to complete the polymerization reaction. In this polymerization, the monomer mixture concentration was 72.6 wt %.

The obtained acrylic copolymer having an acid anhydride group was a colorless transparent liquid with a solid content ratio of 71.4 wt %, a number average molecular weight measured with the GPC of 2,000, and a weight average molecular weight of 3,000.

Comparative Examples

An acrylic copolymer having an acid anhydride group was obtained with the same procedure as Example 1, except for the fact that the amount of the solvent pre-loaded in the vessel was changed to 100 parts, the amount of the solvent used to dissolve maleic acid anhydride was changed to 30 parts, the amount of the solvent used for the post-shot was changed to 2 parts, and the amount of the solvent used for rinsing was changed to 5 parts. In this polymerization, the monomer mixture concentration was 43.8 wt %.

The obtained acrylic copolymer having an acid anhydride group was a colorless transparent liquid with a solid content ratio of 40.7 wt %, a weight average molecular weight of 3,000 and a number average molecular weight of 2,000 as measured with the GPC.

Reference Example 105 parts of xylene was loaded into a pressure tight vessel equipped with a stirrer, a thermometer, a reflux condenser, and a dropping pump. In a nitrogen atmosphere the temperature was raised to 130° C. while stirring was maintained. A mixture of 5 parts of styrene, 15 parts of methyl methacrylate, 12.5 parts of 2-ethylhexyl acrylate, 15 parts of 2-ethylhexyl methacrylate, and 28.5 parts of n-butyl methacrylate as well as 24 parts of maleic acid anhydride dissolved in 30 parts of propylene glycol monomethyl ether acetate along with a mixed solution of 17 parts oft-butylperoxy-2-ethylhexanoate and 15 parts of xylene were dropped over three hours using a dropping funnel. After completion of the dropping, heating was continued at 130° C. for 30 minutes. Furthermore, a mixed solution of 2 parts of t-butylperoxy-2-ethylhexanoate and 2 parts of xylene was dropped as a post-shot, followed by an hour of heating to complete the polymerization reaction. After this, 140 parts of the solvent was removed by means of distillation under reduced pressure, followed by the addition of 40 parts of butyl acetate.

The obtained acrylic copolymer having an acid anhydride group was a colorless transparent liquid with a solid content ratio of 42.8 wt %, a weight average molecular weight of 3,000 and a number average molecular weight of 2,000 as measured with the GPC.

Preparation of the Coating and the Film

A sufficient amount of methanol to open the ring of the acid anhydride group was added to each acrylic copolymer having an acid anhydride group obtained in Example, Comparative example, and Reference example and a half-esterification reaction was carried out for 20 hours at 60° C. After the half-esterification, infrared spectra of each acrylic copolymer did not show a peak from the acid anhydride group.

The half-esterified acrylic copolymer thus obtained was combined with an acrylic copolymer having epoxy groups and hydroxyl groups (an epoxy equivalent of 258, hydroxy group equivalent of 520, and a number average molecular weight of 2,400) in such a way that the carboxyl group equivalent of the half-ester and the epoxy group equivalent was the same, and tetrabutyl ammonium bromide in the amount of 0.5 wt % of the resin solid content was added to obtain a clear coating.

The obtained clear coating was applied on a panel with a white intermediate coating, followed by 30 minutes of baking at 140° C. to obtain a coating panel. A color-difference meter was used to measure Δb of the obtained films. The results are 0.5 and 0.6 for those with the acrylic copolymers having an acid anhydride group of Example and Reference example, respectively, whereas the film with the acrylic copolymer having an acid anhydride group of Comparative example resulted in 2.4, which did not meet the acceptance criterion of less than 1.0.

What is claimed is:

1. A method of preparing an acrylic copolymer having an acid anhydride group with a number average molecular weight of 1,500–5,000 comprising:

polymerizing a monomer mixture of a radical polymerizable monomer having an acid anhydride group and another radical polymerizable monomer at a temperature of 150° C. or higher by using a radical initiator, wherein the concentration of the monomer mixture is 50–75 wt %.

2. The method of preparing an acrylic copolymer having an acid anhydride group of claim 1, wherein said number average molecular weight is 2,000–3,000.

3. The method of preparing an acrylic copolymer having an acid anhydride group according to claim 1, wherein said monomer mixture concentration is 55–70 wt %.

4. The method of preparing an acrylic copolymer having an acid anhydride group according to claim 2, wherein said monomer mixture concentration is 55–70 wt %.

5. The method of preparing an acrylic copolymer having an acid anhydride group according to claim 1, wherein said radical initiator is an active radical species that generate alkyl radicals.

6. The method of preparing an acrylic copolymer having an acid anhydride group according to claim 2, wherein said radical initiator is an active radical species that generate alkyl radicals.

7. The method of preparing an acrylic copolymer having an acid anhydride group according to claim 3, wherein said radical initiator is an active radical species that generate alkyl radicals.

8. The method of preparing an acrylic copolymer having an acid anhydride group according to claim 4, wherein said radical initiator is an active radical species that generate alkyl radicals.

* * * * *